United States Patent
Mori et al.

(10) Patent No.: US 7,091,699 B2
(45) Date of Patent: Aug. 15, 2006

(54) RECHARGEABLE BATTERY DEVICES

(75) Inventors: Tatsuki Mori, Anjo (JP); Kazuyuki Sakakibara, Anjo (JP); Masaaki Fukumoto, Anjo (JP)

(73) Assignee: Makita Corporation, Anio (JP)

( * ) Notice: Subject to any disclaimer, the term of this patent is extended or adjusted under 35 U.S.C. 154(b) by 0 days.

(21) Appl. No.: 10/816,583

(22) Filed: Apr. 1, 2004

(65) Prior Publication Data
US 2004/0239293 A1 Dec. 2, 2004

(30) Foreign Application Priority Data
Apr. 1, 2003 (JP) .............................. 2003-098591

(51) Int. Cl.
*H02J 7/00* (2006.01)
(52) U.S. Cl. ...................................................... 320/132
(58) Field of Classification Search ........ 320/DIG. 21, 320/132, 106; 340/636.1
See application file for complete search history.

(56) References Cited

U.S. PATENT DOCUMENTS

| | | | |
|---|---|---|---|
| 5,747,189 A | 5/1998 | Perkins | 429/91 |
| 5,767,659 A * | 6/1998 | Farley | 320/106 |
| 5,805,069 A * | 9/1998 | Mitsui et al. | 340/636.1 |
| 6,051,957 A | 4/2000 | Klein | 320/132 |
| 6,191,556 B1 * | 2/2001 | Galbraith et al. | 320/132 |
| 6,920,341 B1 | 7/2005 | Fukunishi | 455/573 |

FOREIGN PATENT DOCUMENTS

| | | |
|---|---|---|
| EP | 661 769 | 5/1995 |
| JP | 04-055781 | 2/1992 |
| JP | 06-276690 | 9/1994 |

OTHER PUBLICATIONS

European Search Report; Apr. 27, 2005.

* cited by examiner

*Primary Examiner*—Pia Tibbits
(74) *Attorney, Agent, or Firm*—Orrick Herrington & Sutcliffe, LLP

(57) ABSTRACT

Battery pack 10 may include rechargeable battery 12 and remaining capacity indicating circuit 14 for indicating the remaining capacity of the battery 12. Remaining capacity indicating circuit 14 may be coupled to the battery 12 via first switch SW1. When first switch SW1 is turned ON, a current flows from battery 12 to remaining capacity indicating circuit 14. When the first switch SW1 is turned OFF, the current flowing from battery 12 to remaining capacity indicating circuit 14 is turned OFF. The first switch SW1 may be coupled to first voltage detecting circuit (R2, R3) for detecting the voltage of battery 12. When the voltage that is being detected of battery 12 falls below a first predetermined value, first switch SW1 is turned off. Battery pack 10 may further include cut-off circuit (SW2, R4, R5) that cuts off the flow of current from battery 12 to first voltage detecting circuit (R2, R3) when first switch SW1 has been turned OFF.

15 Claims, 6 Drawing Sheets

RECHARGEABLE BATTERY DEVICES

CROSS REFERENCE

This application claims priority to Japanese patent application number 2003-98591, filed Apr. 1, 2003, the contents of which are hereby incorporated by reference as if fully set forth herein.

BACKGROUND OF THE INVENTION

1. Field of the Invention

The present invention relates to rechargeable battery devices (e.g., a battery pack, etc.) having a function for indicating remaining battery capacity of a battery.

2. Description of the Related Art

Japanese Laid-open Patent Publication No. 6-276690 describes a battery packs that have a rechargeable battery. The known battery pack includes a remaining capacity indicating circuit. A plus pole of the rechargeable battery is connected with the remaining capacity indicating circuit via a switch. The switch is connected to a voltage detecting circuit for detecting the voltage of the rechargeable battery. When the voltage detected by the voltage detecting circuit falls below a reference voltage, the switch is turned off. Therefore, the supply of power to the remaining capacity indicating circuit from the rechargeable battery is automatically halted, and over-discharge of the rechargeable battery is prevented.

SUMMARY OF THE INVENTION

However, in the known battery pack, the current continues to flow to the voltage detecting circuit even after the supply of power to the remaining capacity indicating circuit has been halted. Consequently, the rechargeable battery continues to be discharged even after the supply of power to the remaining capacity indicating circuit has been halted, and over-discharge of the rechargeable battery occurs. For example, a long period may elapse between being shipped from the factory and being used by the user, and in this case, over-discharge of the rechargeable battery may occur.

It is, accordingly, one object of the present teachings to provide improved battery packs that can prevent over-discharge of a rechargeable battery in the case where the battery packs are left unused for a long period.

In one aspect of the present teachings, a battery pack may include one or more rechargeable battery cells (e.g., nickel metal hydride battery cells, nickel cadmium battery cells). The battery pack may also include means for indicating the remaining capacity of the battery cells. For example, the indicating means may comprise a plurality of light emitting diodes. The indicating means may be coupled to the battery cells via a first switch (e.g., a field effect transistor). When the first switch is turned ON, current may flow from the battery cells to the indicating means. When the first switch is turned OFF, the current flowing from the battery cells to the indicating means may be preferably turned OFF. The first switch may be also coupled to a first voltage detecting circuit for detecting the voltage of the battery cells. When the voltage of the battery cells, which is detected by the first voltage detecting circuit, has fallen below a first predetermined value, the first switch may be turned OFF. The battery pack may further include a cut-off circuit that cuts off the flow of current from the battery cells to the first voltage detecting circuit when the first switch has been turned OFF.

In this battery pack, the first switch is turned OFF when the voltage of the battery cells, which is detected by the first voltage detecting circuit, falls below the first predetermined value, and the flow of current from the battery cells to the indicating means is cut off. Further, when the first switch is turned OFF, the cut-off circuit automatically cuts off the flow of current from the battery cells to the first voltage detecting circuit. Consequently, the flow of current to the first voltage detecting circuit automatically halts after the supply of power to the indicating means is halted. As a result, over-discharge of the battery cells can be prevented.

In another aspect of the present teachings, the battery pack may be used to supply power to a cordless appliance (e.g., cordless power tool, cordless electric vacuum cleaner). For example, the battery pack may further include a first terminal coupled to a plus (+) pole of the battery cells and a second terminal coupled to a minus (−) pole of the battery cells. When the battery pack is attached to the appliance, the first and second terminals may be connected with terminals of the appliance. As a result, power can be supplied to the appliance from the battery cells of the battery pack via these terminals.

In another aspect of the present teachings, the cut-off circuit may comprise a second switch and a second voltage detecting circuit for detecting the voltage of the battery cells. The battery cells may be connected to the first voltage detecting circuit via the second switch. The second voltage detecting circuit may be coupled to the first and second switches. When the voltage of the battery cells, which is detected by the second voltage detecting circuit, falls below a second predetermined value, the second switch may be preferably turned OFF. When the first switch has been turned OFF, the flow of current from the battery to the second voltage detecting circuit may also stop. Consequently, current does not flow through the second voltage detecting circuit when the first switch has been turned OFF, and this turns OFF the second switch. Further, since the second switch has been turned off, the current flowing from the battery cells to the first voltage detecting circuit is also cut off. That is, when the first switch is turned OFF, the second switch is also turned OFF, and when the second switch is turned OFF, the first switch is also turned off.

In another aspect of the present teachings, the first voltage detecting circuit may preferably include two resistors that divide the voltage of the battery cells. The first voltage detecting circuit may detect the voltage of the battery cells based upon the divided voltage of the two resistors. The battery pack may further include a third terminal coupled to junctions of the two resistors of the first voltage detecting circuit. A predetermined voltage can be applied to the third terminal, or a ground can be connected therewith. Consequently, the voltage detected by the first voltage detecting circuit can be controlled by using the third terminal, and by this means the first switch can be turned ON and FF. For example, in the case where the battery pack is shipped from the factory in a charged state, the ground may be connected with the third terminal. By this means, the first switch is forcibly turned OFF, and the second switch is also turned OFF. As a result, over-discharge of the battery pack can be prevented even if a long period elapses between being shipped from the factory and being used by the user.

Similarly, the second voltage detecting circuit may include two resistors that divide the voltage from the battery cells. The second voltage detecting circuit may detect the voltage of the battery cells based upon the divided voltage of the two resistors of the second voltage detecting circuit.

The battery pack may preferably include a fourth terminal coupled to junctions of the two resistors of the second voltage detecting circuit. By this means, the voltage detected by the second voltage detecting circuit can be controlled, and the second switch and the first switch can be turned ON and OFF.

In another aspect of the present teachings, the battery pack may be arranged and constructed to be removably attached to a power tool. When the battery pack is attached to the power tool, power is supplied to the power tool from the battery cells of the battery pack. The battery pack or the power tool may preferably have a signal output circuit (e.g., power source circuit) coupled to the junctions of the two resistors of the first voltage detecting circuit and/or the junctions of the two resistors of the second voltage detecting circuit. The signal output circuit may output a signal to the junctions of the two resistors of the first voltage detecting circuit and/or the junctions of the two resistors of the second voltage detecting circuit. The signal output circuit may output the first signal when the power tool is being supplied with power from the battery pack, and output a second signal when the power tool is not being supplied with power from the battery pack. The voltage of the second signal may be smaller than the voltage of the first signal. Consequently, the divided voltage of the first voltage detecting circuit (and/or of the second voltage detecting circuit) is prevented from falling too greatly even if the voltage of the battery cells of the battery pack falls greatly due to a starting current when the power tool is started, due to a large current load. By this means, the first switch (and/or the second switch) can be prevented from being turned OFF by the starting current.

These aspects and features may be utilized singularly or, in combination, in order to make improved battery pack. In addition, other objects, features and advantages of the present teachings will be readily understood after reading the following detailed description together with the accompanying drawings and claims. Of course, the additional features and aspects disclosed herein also may be utilized singularly or, in combination with the above-described aspect and features.

DETAILED DESCRIPTION OF THE INVENTION

First Detailed Representative Embodiment

Figure 1:
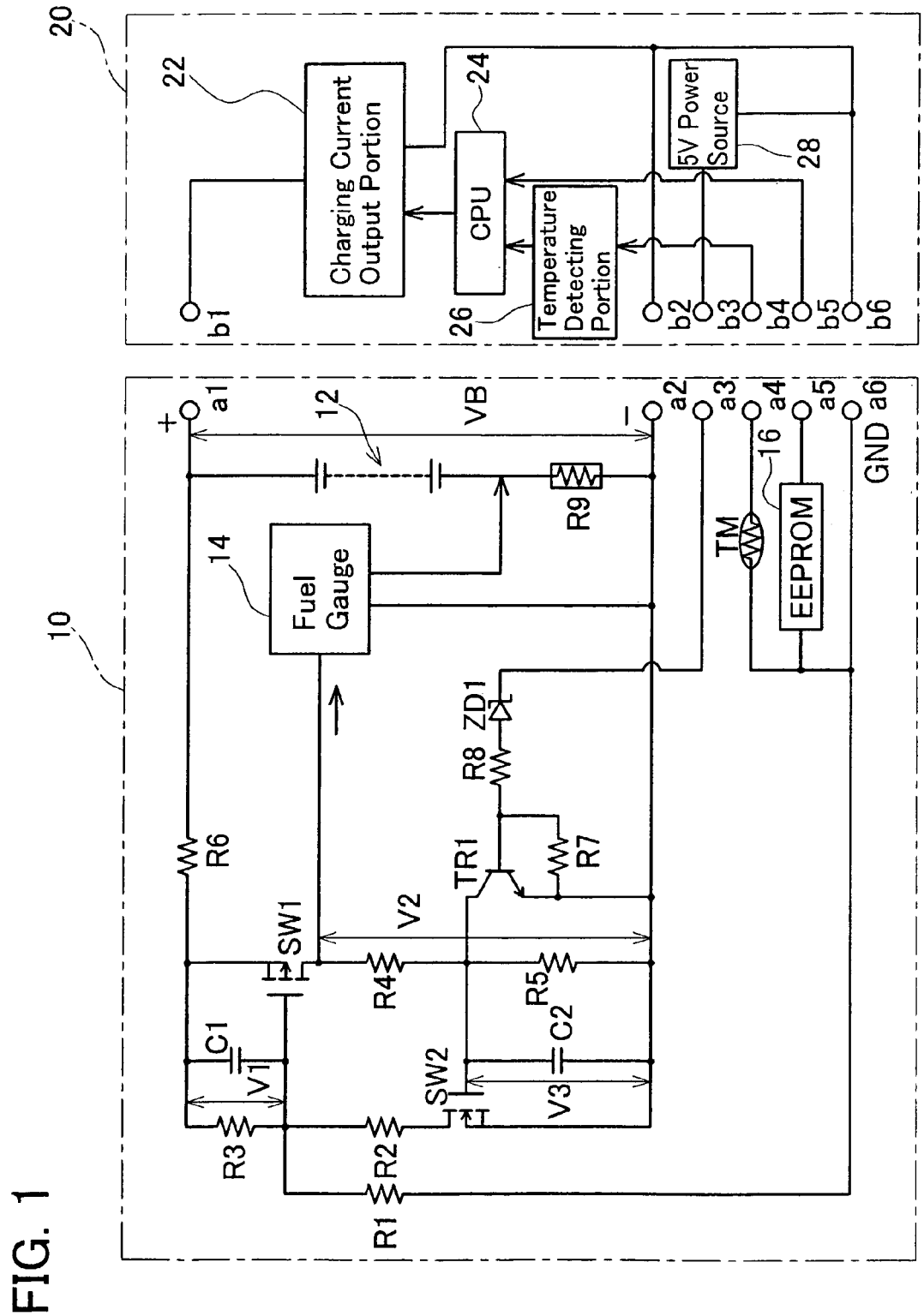
FIG. 1 is a block diagram showing a representative circuit of a battery pack according to a first representative embodiment of the present teachings when the battery pack is attached to a battery charger.

A battery pack according to a first representative embodiment of the present teachings will be explained with reference to the drawings. As shown in FIG. 1, battery pack 10 may include a plurality of rechargeable batteries 12 (e.g., a nickel metal hydride battery cells) that are serially connected. A plus pole of batteries 12 may be connected with a + terminal (a1), and a minus pole of batteries 12 may be connected with a − terminal (a2) via shunt resistor R9.

Figure 2:
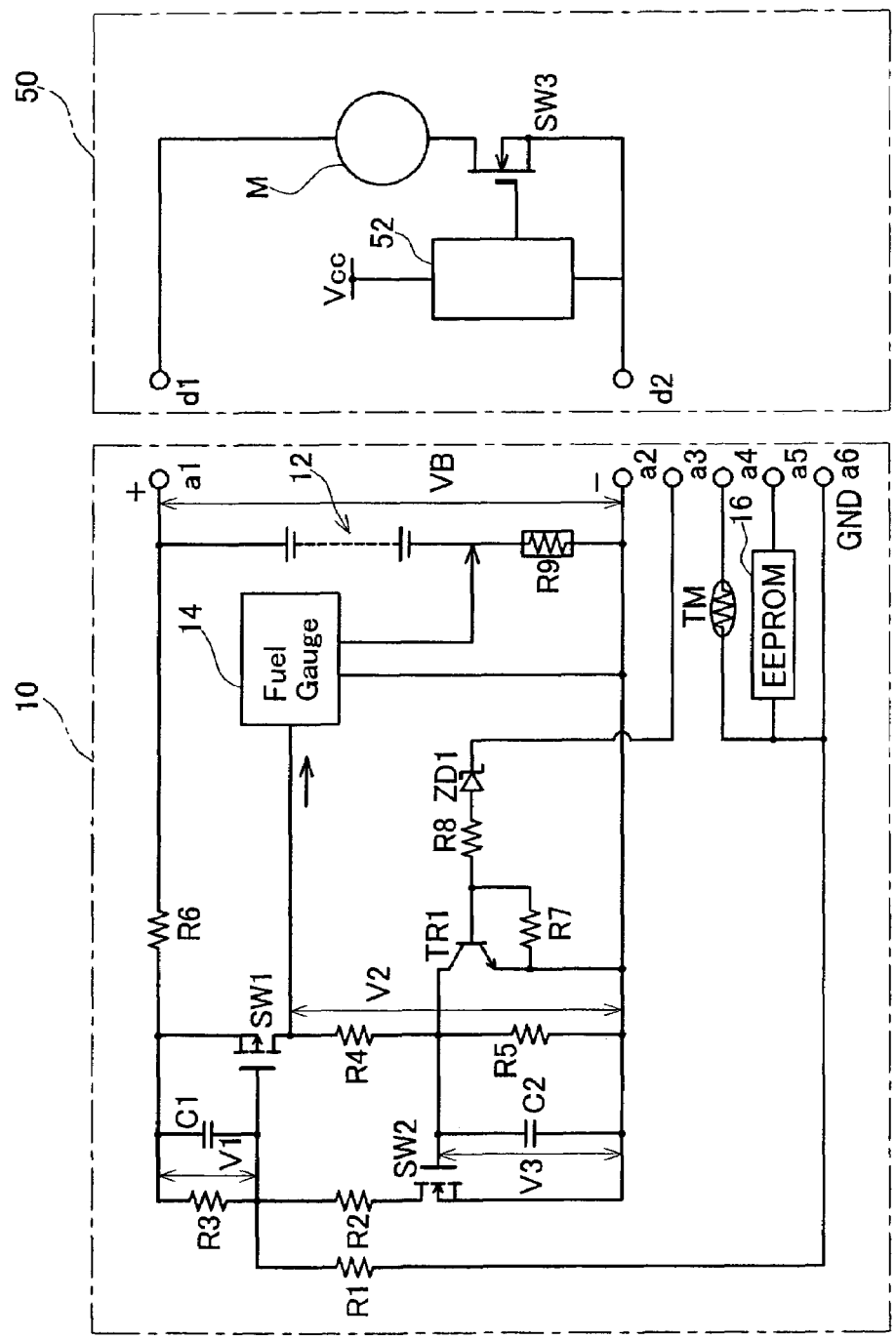
FIG. 2 is a block diagram showing the battery pack circuit of the first representative embodiment when the battery pack is attached to a power tool.

When battery pack 10 is attached to battery charger 20, the + terminal (a1) and the − terminal (a2) are connected with charging current output portion 22 via terminals (b1) and (b2) of battery charger 20. By this means, charging current is supplied from charging current output portion 22 of battery charger 20 to batteries 12. On the other hand, as shown in FIG. 2, when battery pack 10 is attached to power tool 50, the + terminal (a1) and the − terminal (a2) are connected with terminals (d1) and (d2) of power tool 50, power thereby being supplied from batteries 12 to motor M of power tool 50. Power tool 50 may comprise switching element SW3 (e.g., a field effect transistor) which is disposed between motor M and the terminal (d2). Power tool 50 may also include controller 52 that controls the duty ratio of switching element SW3, thereby controlling the quantity of power supplied from batteries 12 to motor M.

Battery pack 10 may also include remaining capacity indicating circuit 14 that indicates the remaining battery capacity of batteries 12. Remaining capacity indicating circuit 14 may be connected with the plus pole of batteries 12 via a protective resistor R6 and a first switching element SW1 (e.g., a P-channel field effect transistor). Remaining capacity indicating circuit 14 may preferably calculate the remaining battery capacity of batteries 12 on the basis of the current flowing through batteries 12, and indicate the remaining battery capacity that was obtained through this calculation. The remaining battery capacity can be displayed by, for example, changing numbers of an illuminated LED in accordance with the remaining battery capacity.

The − terminal (a2) of battery pack 10 may be connected with an output terminal (i.e., a terminal connected with remaining capacity indicating circuit 14) of first switching element SW1 via two resistors R4 and R5. A corrector terminal of transistor TR1 may be connected with junctions of the resistors R4 and R5. A base terminal of transistor TR1 may be connected with a terminal (a3) via a resistor R8 and a Zener diode ZD1. An emitter terminal of transistor TR1 may be connected with the − terminal (a2). The emitter terminal of transistor TR1 may be also connected with the base terminal of transistor TR1 via resistor R7.

First switching element SW1, resistor R4 and resistor R5 may be aligned at the plus pole of batteries 12, and resistor R3, resistor R2, and second switching element SW2 (e.g., an N-channel field effect transistor) may be connected therewith. Junctions of resistor R3 and resistor R2 may be connected with a gate terminal of first switching element SW1. Further, the junctions of resistor R3 and resistor R2 may be connected with a ground terminal (a6) via resistor R1. The junctions of resistor R4 and resistor R5 may be connected with a gate terminal of second switching element SW2.

Battery pack may further include thermistor TM for detecting the temperature of batteries 12, and EEPROM 16 for storing charging characteristic information of batteries 12. Thermistor TM and EEPROM 16 may be disposed within a case of battery pack 10. When battery pack 10 is attached to battery charger 20, thermistor TM is preferably connected with temperature detecting portion 26 of battery charger 20 via a terminal (b4) of battery charger 20 and a terminal (a4) of battery pack 10. Further, EEPROM 16 is connected with CPU 24 via a terminal (b5) of battery charger 20 and a terminal (a5) of battery pack 10. Temperature detecting portion 26 may detect the temperature of batteries 12 on the basis of the output signal from thermistor TM, and outputs this detected temperature to CPU 24. On the basis of the temperature of batteries 12 output from temperature detecting portion 26 and the charging characteristic information of batteries 12 read from EEPROM 16, CPU 24 may determine the charging current value supplied to batteries 12 from charging current output portion 22. Further, battery charger 20 may also include 5 V power source 28, this 5 V power source 28 being connected with a terminal (b3) and a ground terminal (b6).

Next, the operation of battery pack 10 will be explained. First, a state will be explained in which battery pack 10 is not attached to battery charger 20 and in which power is being supplied from batteries 12 to remaining capacity indicating circuit 14. In the state whereby power is being supplied from batteries 12 to remaining capacity indicating circuit 14, first switching element SW1 and second switching element SW2 are both ON. That is, a signal that is divided by resistor R3 and resistor R2 of voltage VB of batteries 12 is input to the gate terminal of first switching element SW1, and first switching element SW1 is turned ON. Further, a signal that is divided by resistor R4 and resistor R5 of a voltage V2 (i.e., voltage VB of batteries 12) between first switching element SW1 and the − terminal (a2) is input to the gate terminal of second switching element SW2, and second switching element SW2 is turned ON.

When the remaining battery capacity of batteries 12 becomes low and a voltage V1 between both ends of resistor R3 falls below a predetermined value, first switching element SW1 is turned OFF. When first switching element SW1 is turned OFF, current does not flow to resistor R4 and resistor R5, and second switching element SW2 is turned OFF. Similarly, the remaining battery capacity of batteries 12 becomes low and a voltage V3 between both ends of resistor R5 falls below the predetermined value, second switching element SW2 is turned OFF. When second switching element SW2 is turned OFF, current does not flow to resistors R3 and R2, and first switching element SW1 is turned OFF. By this means, voltage V1=voltage V3=0V, and the power source of the remaining capacity indicating circuit 14 is latched OFF. Consequently, when the remaining battery capacity of batteries 12 becomes low, the current flowing to remaining capacity indicating circuit 14 is automatically cut off. Furthermore, the current flowing to resistors R3 and R2 is also automatically cut off. By this means, over-discharge of batteries 12 can be prevented even in the case where battery pack 10 is left unused for a long period.

Next, a state will be explained in which battery pack 10 is attached to battery charger 20 and in which power is not being supplied from batteries 12 to remaining capacity indicating circuit 14. When battery pack 10 is attached to battery charger 20, the − terminal (a2) of battery pack 10 and the ground terminal (a6) of battery pack 10 are connected by means of the battery charger 20. As a result, a circuit is formed with the following sequence: batteries 12−resistor R6−resistor R3−resistor R1−the ground terminal (a6)−the − terminal (a2)−shunt resistor R9−batteries 12. Current flows along this circuit from batteries 12. Consequently, charging of batteries 12 is performed by means of battery charger 20, and the voltage VB of batteries 12 increases. Thereupon, the current flowing along the circuit described above increases, this increasing the voltage V1 between the both ends of resistor R3 and turning ON first switching element SW1. When first switching element SW1 is turned ON, current flows to remaining capacity indicating circuit 14, resistor R4 and resistor R5. By this means, the voltage V3 between the both ends of resistor R5 increases, and second switching element SW2 is turned ON.

In this manner, turning ON first switching element SW1 ensures the voltage V3 for turning ON second switching element SW2, and turning ON second switching element SW2 ensures the voltage V1 for turning ON first switching element SW1. In this manner, the power source of remaining capacity indicating circuit 14 is latched ON and consequently power is supplied to remaining capacity indicating circuit 14 from batteries 12 even if battery pack 10 is removed from battery charger 20 (i.e., even if the − terminal (a2) and the ground terminal (a6) are separated).

Furthermore, first switching element SW1 and second switching element SW2 may be latched ON in order to confirm all the operations of battery pack 10 during quality control performed before battery pack 10 is shipped from the factory. In that case, it is preferred that, when quality control is completed, a voltage greater than a specific voltage of the Zener diode ZD1 is applied between the terminal (a3) and the − terminal (a2) of battery pack 10 by means of a special purpose jig. When this type of voltage is applied between the terminal (a3) and the − terminal (a2), transistor TR1 is turned ON, and the voltage V3 between the both ends of resistor R5 becomes "0". Consequently, second switching element SW2 is turned OFF, and first switching element SW1 is also turned OFF. By this means, the power source to remaining capacity indicating circuit 14 is latched OFF. As a result, if battery pack 10 is shipped in this state, over-discharge of batteries can be prevented even in the case where a long period elapses between being shipped from the factory and being used by the user.

Further, in the above representative embodiment, it is possibly to vary the voltage of batteries when first switching element SW1 is turned OFF, and to vary the voltage of batteries 12 when second switching element SW2 is turned OFF, by means of, for example, varying the settings of resistors R3 and R2 and resistors R4 and R5. By this means, the voltage of batteries 12 when first switching element SW1 is turned OFF, and the voltage of batteries 12 when second switching element SW2 is turned OFF, can be set to be an identical voltage, or can be set to be differing voltages.

Second Detailed Representative Embodiment

Next, a battery pack according to a second representative embodiment of the present teachings will be explained with reference to the drawings. As is clear from FIGS. 3 to 5, battery pack 60 of the second representative embodiment has approximately the same configuration as battery pack 10 of the first representative embodiment, and a power source to remaining capacity indicating circuit 62 is latched ON or latched OFF by means of first switching element SW1 and second switching element SW2. However, the second representative embodiment differs from the first representative embodiment in the following points: (1) a signal output from output terminal 64 of remaining capacity indicating circuit 62 to a gate terminal of second switching element SW2, (2) an off-latching method that is used during shipping, and (3) an off-latching releasing method used during attachment to the battery charger. The points differing from the first representative embodiment will be explained in detail below.

Figure 4:
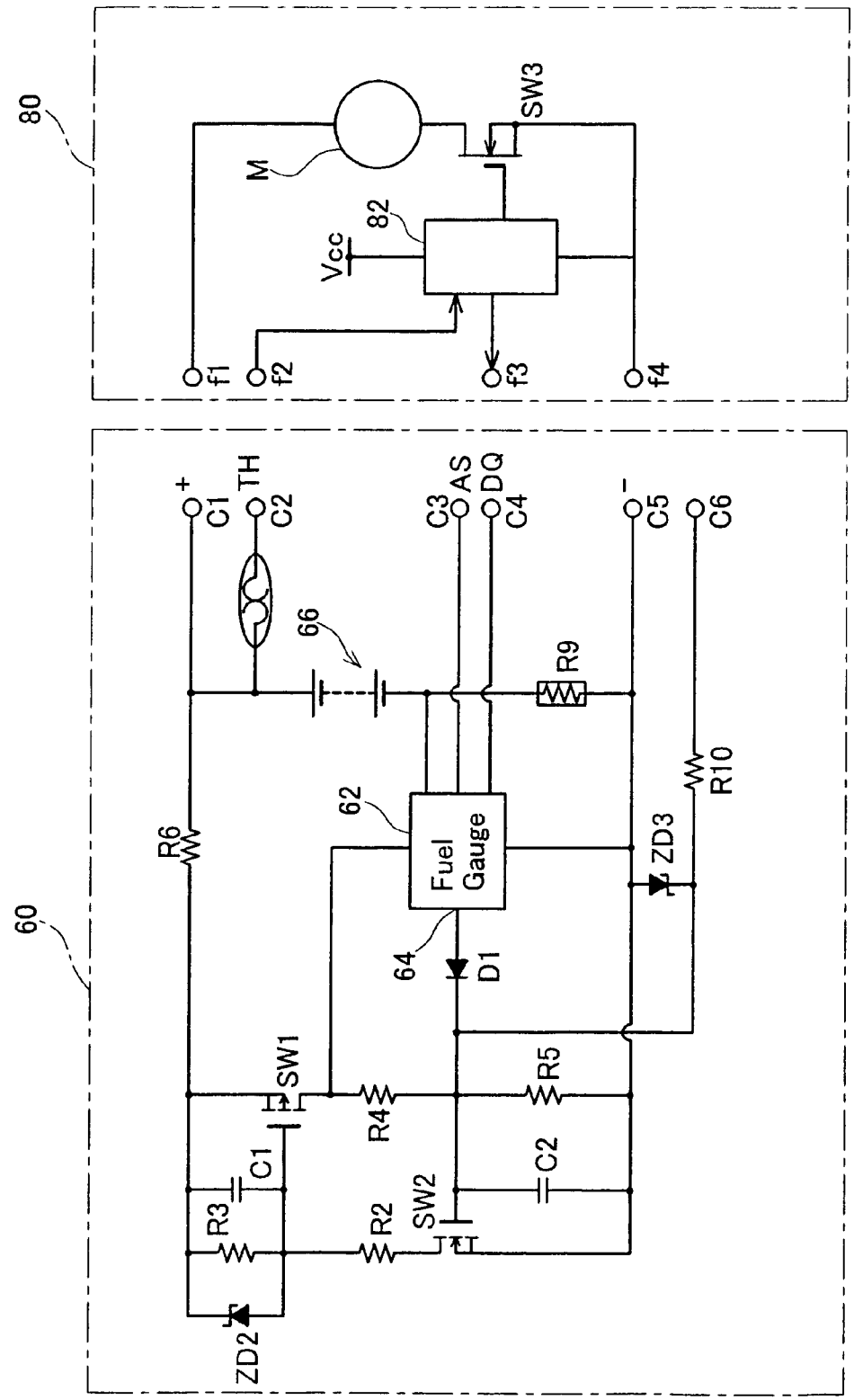
FIG. 4 is a block diagram showing the battery pack circuit of the second representative embodiment when the battery pack is attached to a power tool.

As shown in FIG. 4, battery pack 60 of the second representative embodiment is attached in a removable manner to power tool 80. Power tool 80 may include motor M and controller 82 for controlling motor M. Motor M may be coupled to a terminal (f1), and may be coupled to a terminal (f2) via switching element SW3 (e.g., a field effect transistor). Controller 82 may control the duty ratio of switching element SW3, thereby controlling the quantity of power supplied to motor M. Controller 82 may be also coupled to a terminal (f3). Controller 82 may preferably output a signal to switching element SW3 in order to supply power to motor M when a trigger switch (not shown) is turned on, and also output a trigger ON signal to the terminal (f3).

When battery pack 60 is attached to power tool 80, a terminal (c1) of battery pack 60 is connected with the terminal (f1), a terminal (c3) of battery pack 60 is connected with the terminal (f3), and a terminal (c5) of battery pack 60 is connected with a terminal (f4). Consequently, when the trigger switch of power tool 80 is turned on, motor M is supplied with power from batteries 66 of battery pack 60 via the terminals (c1, c5, f1, and f4). When motor M is supplied with power from battery pack 60, controller 82 outputs the trigger ON signal to remaining capacity indicating circuit 62 via the terminals (f3) and (c3). Remaining capacity indicating circuit 62 determines whether power is being supplied to power tool 80 from batteries 66 on the basis of the trigger ON signal.

Moreover, in the case where battery pack 60 is attached to battery charger 70 (see FIG. 3), remaining capacity indicating circuit 62 may detect whether a current is flowing through shunt resistor R9 in order to calculate the remaining battery capacity of batteries 66. Consequently, remaining capacity indicating circuit 62 is able to determine whether batteries 66 is being charged on the basis of whether current is flowing through shunt resistor R9.

Figure 6:
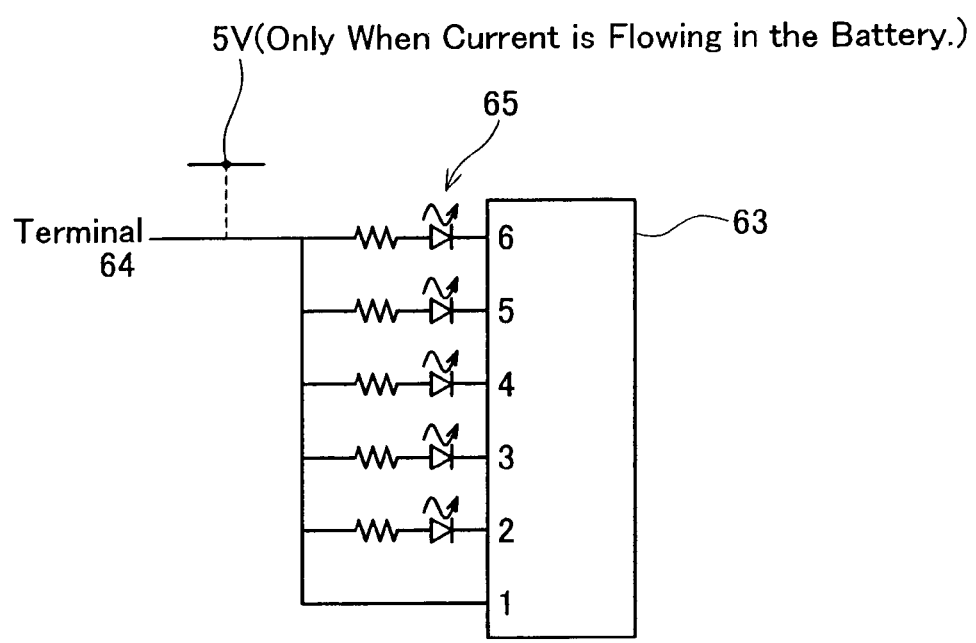
FIG. 6 is a block diagram showing a portion of a circuit within a remaining capacity indicating circuit of the second representative embodiment.

As shown in FIG. 6, remaining capacity indicating circuit 62 may comprise a 5 V power source that produces a 5 V signal only when current is flowing in batteries 66 (i.e., when power is being supplied from batteries 66 to motor M of power tool 80 (see FIG. 4), or when charging current is flowing to batteries 66 from battery charger 70 (see FIG. 3)). Remaining capacity indicating circuit 62 may also include a plurality of light emitting diodes 65 and IC element 63. Light emitting diodes 65 may be aligned and be coupled to the 5 V power source, other ends of these light emitting diodes 65 being coupled to an IC element 63. IC element 63 may control the illuminated numbers of light emitting diodes 65 in accordance with the remaining battery capacity of batteries 66.

The 5 V power source of remaining capacity indicating circuit 62 may be preferably connected with output terminal 34 of remaining capacity indicating circuit 62. The gate terminal of second switching element SW2 may be also connected with output terminal 34 via a diode D1 (see FIGS. 3 and 4). As a result, when power is supplied from batteries 66 to power tool 80 (or when batteries 66 is being charged), a signal of at least 5 V is input to the gate terminal of second switching element SW2. Consequently, second switching element SW2 is not turned OFF when the voltage of batteries 66 falls greatly due to a starting current when power tool 80 is started, due to a large current load, etc. Further, in the second representative embodiment, since the starting current when power tool 80 is started, etc. need not be taken into consideration, it is possible to cause an operating voltage of second switching element SW2 (i.e., the voltage of batteries 66 when second switching element SW2 is turned OFF) to be high, thereby allowing the discharge from batteries 66 to be halted early.

In the second representative embodiment, an operating voltage of first switching element SW1 (i.e., the voltage of batteries when first switching element SW1 is turned OFF) may be set to be lower than the operating voltage of second switching element SW2. Consequently, first switching element SW1 is not turned OFF when the voltage of batteries 66 falls greatly due to a starting current when power tool 70 is started, due to a large current load, etc.

Figure 5:
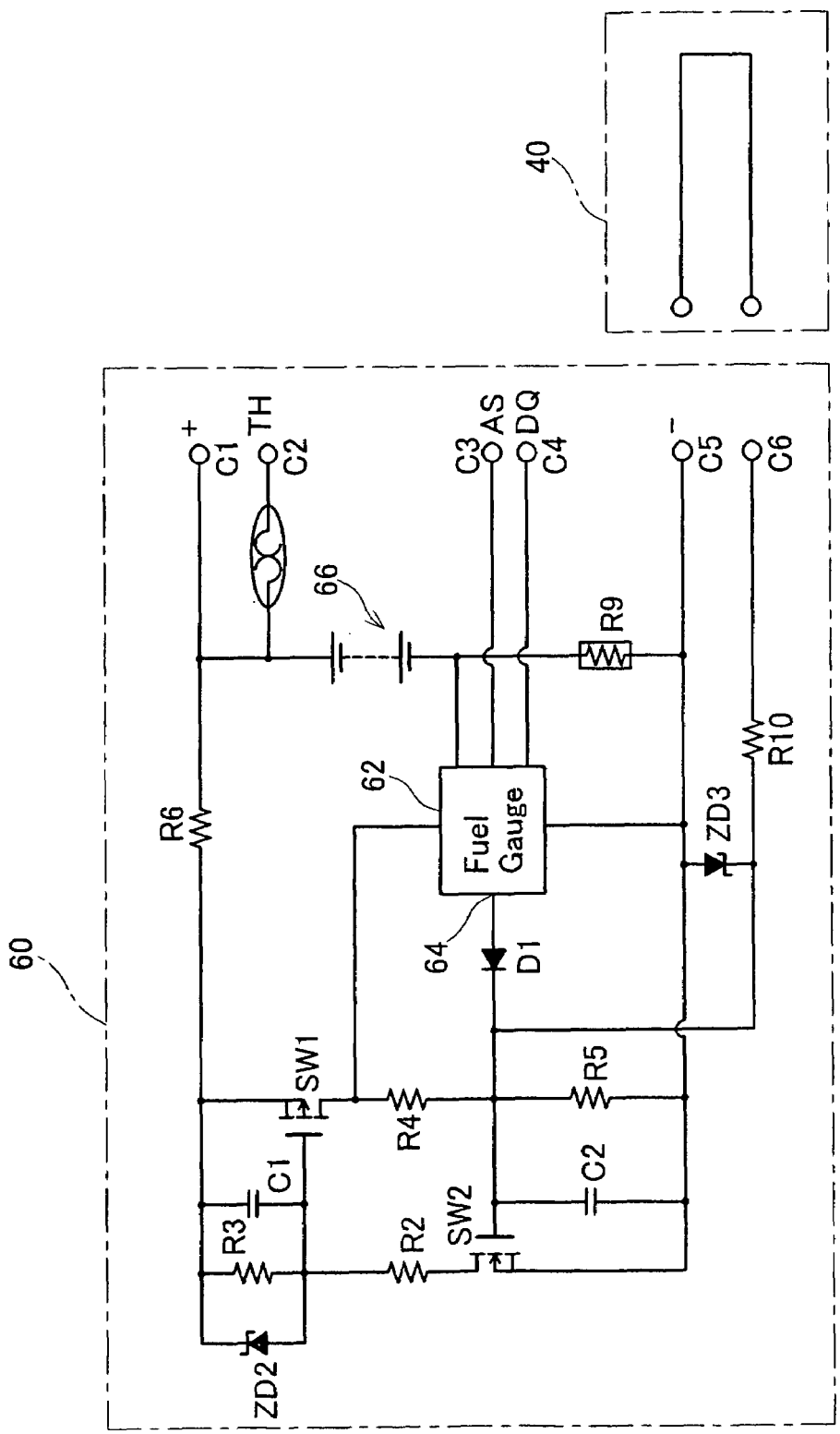
FIG. 5 is a block diagram showing the battery pack circuit of the second representative embodiment when the battery pack is attached to a jig.

Further, as shown in FIG. 5, special purpose jig 40 may be used to perform off latching of remaining capacity indicating circuit 62 of battery pack 60. That is, a terminal (c6) may be coupled to the gate terminal of second switching element SW2 via a resistor R10. The terminal (c6) and the terminal (c5) are connected by a Zener diode ZD3. In order to perform off latching of first switching element SW1 and second switching element SW2 before shipment from the factory, the terminal (c5) and the terminal (c6) are connected by jig 40. When the terminal (c5) and the terminal (c6) are connected, a "0" V signal is input to the gate terminal of second switching element SW2. As a result, second switching element SW2 is turned OFF, and thereby first switching element SW1 is also turned OFF.

Figure 3:
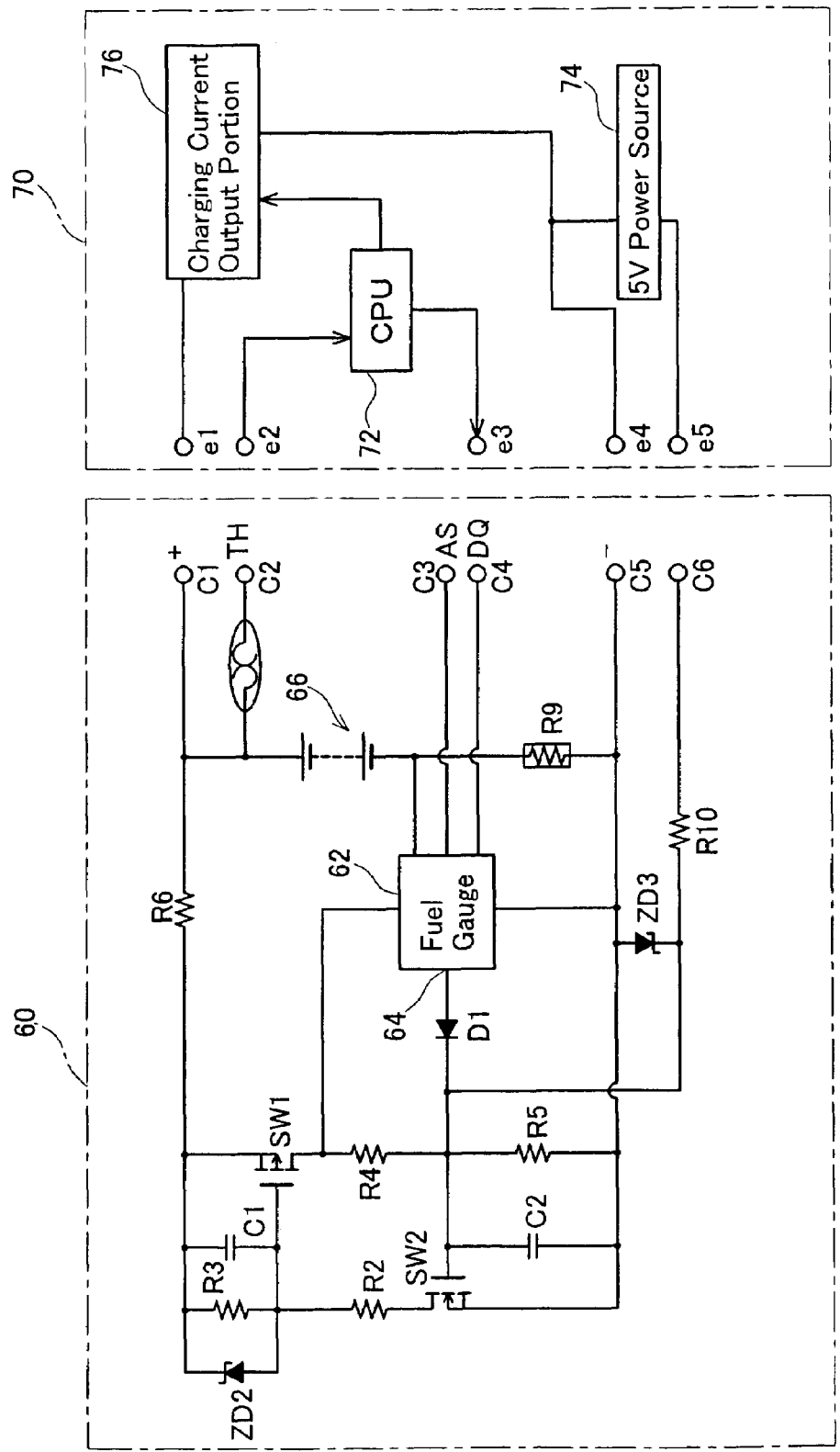
FIG. 3 is a block diagram showing a representative circuit of a battery pack according to a second representative embodiment of the present teachings when the battery pack is attached to a battery charger.

Furthermore, battery pack 60 simply needs to be attached to battery charger 70 in order to release the off-latched state of battery pack 60. That is, as shown in FIG. 3, when battery pack 60 is attached to battery charger 70, a plus pole of batteries 66 is connected with charging current output portion 76 via a terminal (e1) of battery charger 70 and the terminal (c1), and similarly, a minus pole of batteries 66 is connected with charging current output portion 76 via a terminal (e4) of battery charger 70 and the terminal (c5). By this means, a charging current is supplied to batteries 66 from charging current output portion 76. CPU 72 may determine, from charging current output portion 76, the value of the charging current output. Further, CPU 72 may be connected with remaining capacity indicating circuit 62 via a terminal (e3) and a terminal (c4), and may preferably determine whether charging of batteries 66 is complete on the basis of signals from remaining capacity indicating circuit 62.

Furthermore, 5 V power source 74 of battery charger 70 may be connected with terminals (e4 and e5) of battery charger 70. As a result, when battery pack 60 is attached to battery charger 70, 5 V power source 74 is connected with the terminal (c5) and the terminal (c6). Consequently, a 5 V signal is input to the gate terminal of second switching element SW2 when battery pack 60 is attached to battery charger 70, and second switching element SW2 is turned ON. When second switching element SW2 is turned ON, first switching element SW1 is also turned ON. By this means, the off-latched state of battery pack 60 is released.

Moreover, in the present representative embodiment, the explanation was given using, as an example, the present teachings is not limited to this type of configuration. For example, an embodiment is also possible wherein a transistor is utilized instead of the field effect transistor. In that case, the divided voltage of the rechargeable battery may be input to one end of a comparator, and the divided voltage of the rechargeable battery is compared with a reference voltage. When the voltage of the rechargeable battery has fallen lower than the reference voltage, the output of the comparator is turned OFF, thereby turning off the transistor.

Finally, although the preferred representative embodiment has been described in detail, the present embodiment is for illustrative purpose only and not restrictive. It is to be understood that various changes and modifications may be made without departing from the spirit or scope of the appended claims. In addition, the additional features and aspects disclosed herein also may be utilized singularly or in combination with the above aspects and features.

The invention claimed is:

1. A battery pack comprising:
    a rechargeable battery,
    means for indicating a remaining capacity of the battery, wherein the indicating means is coupled to the battery, wherein the indicating means utilizes power supplied from the battery, thereby indicating the remaining capacity of the battery,
    a first switch electrically connecting and disconnecting the battery with the indicating means,
    a first voltage detecting circuit coupled to the first switch and the battery, wherein the first switch is turned off when the battery voltage detected by the first voltage detecting circuit falls below a first predetermined value,
    a cut-off circuit coupled to the first voltage detecting circuit, wherein the cut-off circuit cuts off the flow of current from the battery to the first voltage detecting circuit when the first switch has been turned off.

2. A battery pack as in claim 1, wherein the cut-off circuit comprises:
    a second switch electrically connecting and disconnecting the battery with the first voltage detecting circuit,
    a second voltage detecting circuit coupled to the first and second switches, wherein the second switch is turned off when the voltage detected by the second voltage detecting circuit falls below a second predetermined value, wherein the flow of current from the battery to the second voltage detecting circuit stops when the first switch has been turned off.

3. A battery pack as in claim 2, wherein the first voltage detecting circuit comprises two resistors that divides the voltage from the battery, wherein the battery pack further comprises:
    a first terminal coupled to a plus pole of the battery,
    a second terminal coupled to a minus pole of the battery,
    a third terminal coupled to junctions of the two resistors of the first voltage detecting circuit.

4. A battery pack as in claim 3, wherein the second voltage detecting circuit comprises two resistors that divides the voltage from the battery, wherein the battery pack further comprises a fourth terminal coupled to junctions of the two resistors of the second voltage detecting circuit.

5. A battery pack as in claim 4, wherein the battery pack is arranged and constructed to be attached to a power tool, and the battery pack supplies power to the power tool via the first and second terminals, wherein the battery pack further comprises means for outputting a signal to the junctions of the two resistors of the first voltage detecting circuit or to the junctions of the two resistors of the second voltage detecting circuit, wherein the outputting means outputs the first signal when the power tool is being supplied with power from the battery, and outputs a second signal when the power tool is not being supplied with power from the battery, wherein the voltage of the second signal is smaller than the voltage of the first signal.

6. An apparatus comprising:
    a rechargeable battery,
    means for indicating a remaining capacity of the battery, wherein the indicating means is coupled to the battery, wherein the indicating means utilizes power supplied from the battery, thereby indicating the remaining capacity of the battery,
    a first switch electrically connecting and disconnecting the battery with the indicating means,
    a first voltage detecting circuit coupled to the first switch and the battery, wherein the first switch is turned off when the battery voltage detected by the first voltage detecting circuit falls below a first predetermined value,
    a cut-off circuit coupled to the first voltage detecting circuit, wherein the cut-off circuit cuts off the flow of current from the battery to the first voltage detecting circuit when the first switch has been turned off.

7. An apparatus as in claim 6, wherein the cut-off circuit comprises:
    a second switch electrically connecting and disconnecting the battery with the first voltage detecting circuit,
    a second voltage detecting circuit coupled to the first and second switches, wherein the second switch is turned off when the voltage detected by the second voltage detecting circuit falls below a second predetermined value, wherein the flow of current from the battery to the second voltage detecting circuit is stopped when the first switch has been turned off.

8. An apparatus as in claim 7, wherein the first voltage detecting circuit comprises two resistors that divides the voltage from the battery, wherein the apparatus further comprises a first terminal coupled to junctions of the two resistors of the first voltage detecting circuit.

9. An apparatus as in claim 7, wherein the second voltage detecting circuit comprises two resistors that divides the voltage from the battery, wherein the apparatus further comprises a second terminal coupled to junctions of the two resistors of the second voltage detecting circuit.

10. A battery pack comprising:
    a rechargeable battery,
    an indicator that displays remaining capacity of the battery, wherein the indicator is coupled to the battery, wherein the indicator utilizes power supplied from the battery, thereby indicating the remaining capacity of the battery,
    a first switch electrically connecting and disconnecting the battery with the indicator,
    a first voltage detecting circuit coupled to the first switch and the battery, wherein the first switch is turned off when the battery voltage detected by the first voltage detecting circuit falls below a first predetermined value,
    a cut-off circuit coupled to the first voltage detecting circuit, wherein the cut-off circuit cuts off the flow of current from the battery to the first voltage detecting circuit when the first switch has been turned off.

11. The battery pack of claim 10 wherein the indicator comprises a LED display.

12. An apparatus comprising:
    a rechargeable battery,
    an indicator circuit that indicates remaining capacity of the battery, wherein the indicator circuit is coupled to the battery, wherein the indicator circuit utilizes power supplied from the battery, thereby indicating the remaining capacity of the battery,
    a first switch electrically connecting and disconnecting the battery with the indicator circuit,
    a first voltage detecting circuit coupled to the first switch and the battery, wherein the first switch is turned off when the battery voltage detected by the first voltage detecting circuit falls below a first predetermined value, a cut-off circuit coupled to the first voltage detecting circuit, wherein the cut-off circuit cuts off the flow of current from the battery to the first voltage detecting circuit when the first switch has been turned off.

13. The apparatus of claim 12 wherein the indicator circuit comprises a LED display.

14. The battery pack of claim 1 wherein the means for indicating comprises an LED display.

15. The apparatus of claim 6 wherein the means for indicating comprises an LED display.

* * * * *